United States Patent
Zheng et al.

(10) Patent No.: US 10,521,071 B2
(45) Date of Patent: Dec. 31, 2019

(54) EXPRESSION CURVE GENERATING METHOD BASED ON VOICE INPUT AND DEVICE THEREOF

(71) Applicant: CIENET TECHNOLOGIES (BEIJING) CO., LTD., Beijing (CN)

(72) Inventors: Liang Zheng, Beijing (CN); Xibin Liu, Beijing (CN)

(73) Assignee: CIENET TECHNOLOGIES (BEIJING) CO., LTD., Beijing (CN)

( * ) Notice: Subject to any disclaimer, the term of this patent is extended or adjusted under 35 U.S.C. 154(b) by 28 days.

(21) Appl. No.: 15/576,894

(22) PCT Filed: May 30, 2016

(86) PCT No.: PCT/CN2016/083911
§ 371 (c)(1),
(2) Date: Nov. 27, 2017

(87) PCT Pub. No.: WO2016/188494
PCT Pub. Date: Dec. 1, 2016

(65) Prior Publication Data
US 2018/0150202 A1   May 31, 2018

(30) Foreign Application Priority Data
May 28, 2015  (CN) .......................... 2015 1 0282863

(51) Int. Cl.
*G06F 3/0481*  (2013.01)
*G06F 3/0482*  (2013.01)
(Continued)

(52) U.S. Cl.
CPC ........ *G06F 3/04817* (2013.01); *G06F 3/0482* (2013.01); *G06F 3/04847* (2013.01);
(Continued)

(58) Field of Classification Search
CPC .... G06F 3/04817; G06F 3/0482; G06F 3/167; H04L 51/10; H04L 51/04
See application file for complete search history.

(56) References Cited

U.S. PATENT DOCUMENTS 6,150,598 A * 11/2000 Suzuki .................. G10H 7/008
  84/603
6,294,896 B1 *  9/2001 Champlin ............ G01R 31/389
  320/134

(Continued)

FOREIGN PATENT DOCUMENTS

CN         1524350 A      8/2004
CN       101072207 A     11/2007
(Continued)

*Primary Examiner* — Reza Nabi
(74) *Attorney, Agent, or Firm* — Mark M. Friedman

(57) ABSTRACT

Disclosed are an expression curve generating method based on voice input, and an device using the same. The method comprises the following steps: (1) inputting voice, and generating an audio file; (2) selecting expression graph buttons corresponding to a type of expressions from multiple expression graph buttons; (3) dividing the audio file into multiple equal time sections according to a time length, and respectively calculating a corresponding volume of each time section; (4) quantifying the corresponding volumes of the different time sections in the audio file into different volume levels; (5) obtaining expression icons corresponding to the volume level of each time section from a same group of expression icons, generating an expression curve using time as a horizontal axis and the volume level as a vertical axis; and (6) displaying the expression curve formed in step (5).

12 Claims, 5 Drawing Sheets

(51) Int. Cl.
  *G06F 3/16* (2006.01)
  *H04L 12/58* (2006.01)
  *G06F 3/0484* (2013.01)

(52) U.S. Cl.
  CPC .............. *G06F 3/167* (2013.01); *H04L 51/10* (2013.01); *H04L 51/04* (2013.01)

(56) References Cited

U.S. PATENT DOCUMENTS

| | | | | |
|---|---|---|---|---|
| 6,785,649 | B1* | 8/2004 | Hoory | G10L 13/08 704/235 |
| 8,841,535 | B2* | 9/2014 | Collins | G06F 3/04817 715/727 |
| 2004/0177745 | A1* | 9/2004 | Kayama | G10H 1/0008 84/609 |
| 2004/0202117 | A1* | 10/2004 | Wilson | H04L 12/1827 370/310 |
| 2004/0235531 | A1* | 11/2004 | Anzawa | G10L 21/06 455/563 |
| 2006/0122842 | A1* | 6/2006 | Herberger | G10H 1/368 704/278 |
| 2006/0293890 | A1* | 12/2006 | Blair | G06F 3/018 704/235 |
| 2008/0134038 | A1* | 6/2008 | Oh | G06F 16/9535 715/727 |
| 2009/0254578 | A1* | 10/2009 | Hall | G11B 27/10 |
| 2012/0030038 | A1* | 2/2012 | Russell | G06Q 30/0277 705/14.73 |
| 2012/0044267 | A1* | 2/2012 | Fino | G09G 5/24 345/667 |
| 2012/0162086 | A1* | 6/2012 | Rhee | G06F 3/018 345/171 |
| 2012/0269155 | A1* | 10/2012 | Liang | H04W 72/0453 370/329 |
| 2014/0324414 | A1* | 10/2014 | Zhang | G06F 17/2765 704/9 |
| 2015/0227630 | A1* | 8/2015 | Solheim | G06F 16/9535 707/722 |
| 2016/0048589 | A1* | 2/2016 | Modi | G06F 16/635 463/25 |
| 2016/0117147 | A1* | 4/2016 | Zambetti | G06F 3/0236 715/727 |
| 2016/0132292 | A1* | 5/2016 | Jeoung | H04M 1/7255 715/727 |
| 2017/0364237 | A1* | 12/2017 | Zheng | G06F 3/04817 |
| 2018/0150202 | A1* | 5/2018 | Zheng | G06F 3/04847 |
| 2018/0165256 | A1* | 6/2018 | Liu | G06F 3/041 |
| 2018/0348996 | A1* | 12/2018 | Zheng | G06F 3/04817 |

FOREIGN PATENT DOCUMENTS

| | | |
|---|---|---|
| CN | 100570545 C | 12/2009 |
| CN | 103634472 A | 3/2014 |
| CN | 104125139 A | 10/2014 |
| CN | 104239304 A | 12/2014 |
| CN | 104850335 A | 8/2015 |

* cited by examiner

EXPRESSION CURVE GENERATING METHOD BASED ON VOICE INPUT AND DEVICE THEREOF

BACKGROUND

Technical Field

The present invention relates to an expression curve generating method and a device thereof, and in particular, to an expression curve generating method based on voice input and a device thereof.

Related Art

In recent years, with the popularization of instant messaging systems, applications such as QQ, WeChat, and MSN have been gradually accepted by the majority of users. When using these applications, to make content to be input more interesting, a user usually needs to input some expressions into the applications, to express special meanings, or enrich content to be input. In some other applications, according to expression habits, sometimes the user also hopes that some expressions can be input, to enrich content to be input.

In the prior art, when an expression needs to be input, the instant messaging system usually provides an expression selection interface for the user, receives an expression selected by the user from the expression selection interface, and then outputs the expression. When the expression selection interface includes a great many expressions, paging display of the expression selection interface is needed, and a page turning instruction of the user is received. Consequently, the operations are relatively complex. In the foregoing expression inputting manner, the user needs to differentiate multiple expressions in an expression selection process, so as to select an expression that can best express the user's meaning accurately. When meanings of some expressions can hardly be differentiated, especially some expressions having similar meanings, the user can learn whether the expression can accurately express the meaning only in an auxiliary manner or by means of prompt. Therefore, the existing expression inputting manner depends, to a relatively large extent, on artificial identification and selection by the user, and the accuracy of expression input is barely satisfactory.

In addition, in an existing expression inputting method, the user can select only one expression for inputting at a single time. However, output of a single expression sometimes cannot completely express pleasure, anger, sorrow, and joy of the user. When multiple expressions need to be output at the same time, the user usually needs to select the expressions at multiple times, and the user needs to repeat a page turning action for multiple times to complete the selection. Such an expression inputting manner is relatively inflexibly and boring, making the input process of the user less interesting.

In addition, a technology of displaying a corresponding expression according to a word input by a user exists in the prior art, for example, the expression inputting method disclosed in the Chinese patent No. ZL200710179718.1. Compared with a technology of directly selecting from numerous expressions, such an expression inputting technology is targeted to some extent, but also has a disadvantage of being uninteresting in terms of inputting. Moreover, both the foregoing two expression inputting manners can perform only simple and linear display when multiple expressions are displayed at the same time, and therefore are uninteresting.

SUMMARY

A technical problem to be resolved by the present invention is to provide an expression curve generating method based on voice input and a device thereof.

To achieve the foregoing objective of the invention, the following technical solutions are used in the present invention:

According to a first aspect of embodiments of the present invention, an expression curve generating method based on voice input is provided, and includes the following steps:

(1) performing voice input to generate an audio file;

(2) selecting an expression graph button corresponding to one type of expression from multiple expression graph buttons, where a single expression graph button corresponds to one or more groups of expression icons, and each group of expression icons includes multiple expression icons respectively corresponding to different sound volume levels;

(3) dividing the audio file into multiple equal time periods according to duration, and calculating a corresponding sound volume of each time period;

(4) quantifying the corresponding sound volumes of the different time periods in the audio file into different sound volume levels;

(5) obtaining an expression icon corresponding to a sound volume level of each time period from a same group of expression icons corresponding to the expression graph button selected in step (2), and generating an expression curve using time as a horizontal axis and the sound volume level as a vertical axis, where the expression icon corresponding to the sound volume level is displayed in the position of the sound volume level corresponding to each time period; and (6) displaying the expression curve formed in step (5).

Preferably, a process of dividing the audio file into N equal time periods, where each time period includes m frames of audio data, and calculating sound volumes corresponding to the N time periods in step (3) includes the following steps:

(31) determining whether the maximum PCM (Pulse Code Modulation) value corresponding to the N time periods is stored, and if yes, entering step (4), or if not, performing step (32);

(32) reading a next frame of audio data, and converting the current frame of audio data into PCM codes;

(33) comparing absolute values of this set of PCM codes, to find the maximum value thereof, and storing the maximum value;

(34) determining whether all m PCM values corresponding to the m frames of audio data in the current time period have been obtained and stored, if yes, entering step (35); or if not, returning to step (32); and

(35) comparing the m PCM values, to find the maximum value thereof, using this value as a sound volume in the time period, and then returning to step (31).

Preferably, in step (4), quantifying N PCM values into four sound volume levels: a very high decibel, a high decibel, an intermediate decibel, and a low decibel includes the following steps:

(41) selecting a minimum PCM value from the N PCM values as a lower limit (n1) of the low decibel, and selecting a maximum PCM value from the N PCM values as an upper limit (n5) of the very high decibel;

(42) calculating a decibel difference between two adjacent levels: d=(the maximum PCM value−the minimum PCM value)/4, and calculating boundary values of decibels corresponding to the four levels: n2=the minimum PCM value+d; n3=the minimum PCM value+2d, and n4=the minimum PCM value+3d; and

(43) forming five parallel lines from bottom to top in an order of n1, n2, n3, n4, and n5, and separately determining a decibel interval within which a PCM value corresponding to each time period correspondingly falls, to determine sound volume levels corresponding to the N PCM values.

Preferably, step (6) may further includes step (60): obtaining a monophonic tone corresponding to a sound volume level of each expression for the expression, and sequentially resonating monophonic tones corresponding to multiple expression icons one by one when the expression curve is being displayed. The monophonic tone corresponding to the sound volume level is preset by a program.

Preferably, in step (60), each group of expression icons includes expression icons corresponding to four sound volume levels, and the expression icons are respectively paired with four tones in the Chinese pinyin.

Preferably, in step (1), a user records, by touching a record button icon, a short voice recording to generate an audio file, and a storage type of the audio file is a universal audio file format such as AMR or G.711.

Preferably, in step (2), the multiple expression graph buttons provided for a user to select are expression graph buttons corresponding to seven emotions "pleasure", "anger", "sorrow", "love", "fear", "disgust", and "hatred".

According to a second aspect of the embodiments of the present invention, an instant messaging device is provided, including:
  a processor; and
  a memory, configured to store an executable instruction of the processor, where
  the processor is configured to perform the expression curve generating method described above.

According to a third aspect of the embodiments of the present invention, an instant messaging system is provided, including:
  a server and at least two terminals, where the terminal is connected to the server by using a wired network or a wireless network, where the terminal is the instant messaging device described above.

According to a fourth aspect of the embodiments of the present invention, a non-transitory computer readable storage medium is provided, when an instruction in the storage medium is executed by a processor of an instant messaging device, the instant messaging device performs the expression curve generating method described above.

By means of the expression curve generating method and the device thereof that are provided in the present invention, a fluctuating expression curve formed by multiple expression icons representing a same type of emotion may be formed at one time based on voice input. Compared with an expression inputting manner used in the existing instant messaging system, the foregoing expression curve generating method has higher input efficiency, and can more vividly and accurately express the user's rich emotions.

DETAILED DESCRIPTION

Technical content of the present invention is further described in detail below with reference to the accompanying drawings and specific embodiments.

Figure 1:
FIG. 1 is an example showing that an expression curve is automatically generated based on voice input.

An expression curve generating method based on voice input provided in the embodiments of the present invention is used to form, on a client at one time, a fluctuating expression curve formed by multiple expression icons shown in FIG. 1. The multiple expression icons are used to express a same type of emotion. Different expression icons correspond to different sound volumes in a voice. In this way, emotion fluctuations of the user can be expressed in varied manners. Compared with a manner of inputting a single expression icon, such an expression inputting manner involves enriched emotions; and compared with a manner of inputting multiple expression icons one by one, such an expression inputting manner has higher efficiency and higher accuracy. Therefore, the user's inputting experience is good. Compared with an arrangement of multiple expression icons that is formed after the user inputs the expression icons one by one, such an expression curve generated based on voice input is more in line with the user's expression habits. Specifically, the expression curve generating method provided in the embodiments of the present invention includes the following steps:

(1) Perform voice input to generate an audio file. (2) Select an expression graph button corresponding to one type of expression from multiple expression graph buttons, where a single expression graph button corresponds to one or more groups of expression icons, and each group of expression icons includes multiple expression icons respectively corresponding to different sound volume levels. (3) Divide the audio file into multiple equal time periods according to duration, and calculating a corresponding sound volume of each time period. (4) Quantify the corresponding sound volumes of the different time periods in the audio file into different sound volume levels, where the number of sound volume levels is the same as the number of expression icons included in a chart of each group of expressions. For example, when each group of expression icons includes four expression icons, corresponding sound volumes of the different time periods in the audio file may be quantified into four different sound volume levels: a very high decibel, a high decibel, an intermediate decibel, and a low decibel. (5) Obtain an expression icon corresponding to a sound volume level of each time period from a same group of expression icons corresponding to the expression graph button selected in step (2), and generate an expression curve using time as a horizontal axis and the sound volume level as a vertical axis, where the expression icon corresponding to the sound volume level is displayed in the position of the sound volume level corresponding to each time period. (6) Display the expression curve formed in step (5). In addition, after step (6), the method may further include step (7): touching the expression graph button selected in step (2) again, changing a group of expression icons, and then returning to step (5) to reconstruct an expression curve by using the group of expression icons. Step (6) may further includes step (60): obtaining a monophonic tone corresponding to a sound volume level of each expression for the expression, and sequentially resonating monophonic tones corresponding to multiple expression icons one by one when the expression curve is being displayed. The monophonic tone corresponding to the sound volume level of each expression is preset by a program. In the foregoing steps, step (60) may be used as an extension of the entire expression curve generating method to select an application.

The following describes, by way of example, the specific process of generating an expression curve by using an example in which each expression icon includes four expression icons respectively corresponding to different sound volume levels. When each group of expression icons includes another number of expression icons, a process of generating an expression curve is similar thereto, and is not described in detail again in the present invention.

Figure 2:
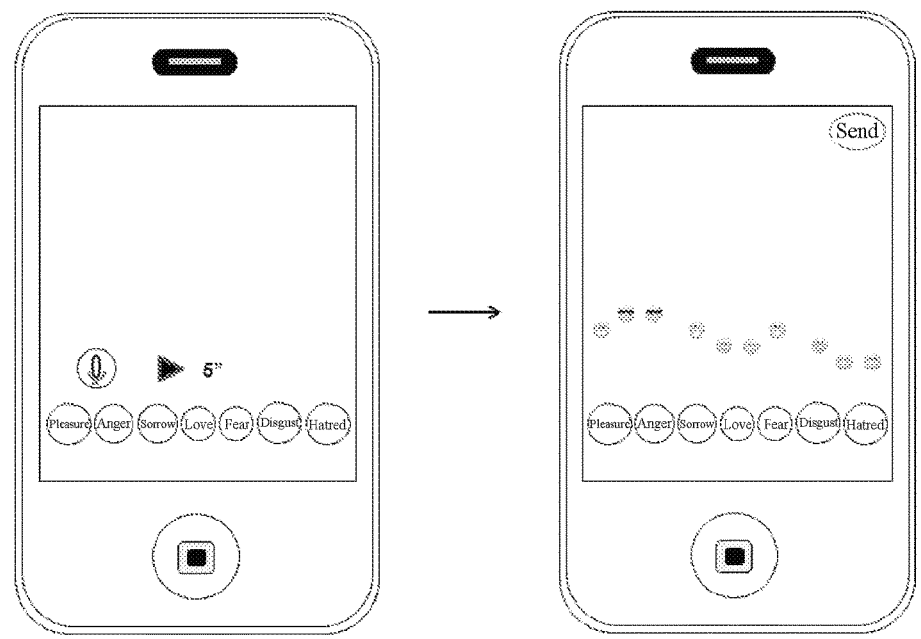
FIG. 2 is an example of an application interface used to implement an expression curve generating method.

In step (1), as shown in an instant messaging information interface of a mobile phone on the left in FIG. 2, the user first records, by touching a record button icon, a short voice recording to generate an audio file. A storage type of the audio file may be an audio file format that is generally used in a mobile communications terminal such as a smart phone or a tablet computer. For example, the storage type is an AMR format file, or a G. 711 A-law encoding format file. To help rapidly generate an expression curve, an upper limit of recording duration may be set for the audio file. For example, an upper limit of time is set to 5 seconds. In step (2), an expression curve generating process is started by selecting a type of expression graph button from the instant messaging information interface. Expression graph buttons corresponding to seven emotions "pleasure", "anger", "sorrow", "love", "fear", "disgust", and "hatred" shown in FIG. 2 may also be set on the information interface. Multiple groups of expression icons corresponding to a same type of emotion may be selected by touching a corresponding expression graph button. In step (4), first four expression icons corresponding to different sound volume levels in one group of expression icons are used to form an expression curve. For an example of an expression curve displayed on a client, refer to an expression curve displayed on a screen of a mobile phone on the right in FIG. 2. The expression curve is formed by using four expression icons in a same group of expression icons of a graph button "joy", where  is an expression icon "joy" with a very high decibel,  is an expression icon "joy" with a high decibel,  is an expression icon "joy" with an intermediate decibel, and  is an expression icon "joy" with a low decibel. If the user is not satisfied with the expression icons used in the expression curve, in step (7), the user may form an expression curve again by changing another group of expression icons by re-clicking the expression graph button "joy" in the instant messaging information interface. Certainly, the user may click the expression graph button for multiple times, to change the expression icons used to form the expression curve. Multiple groups of expression icons corresponding to a same type of expression graph button may be changed sequentially and circularly, or may be changed according to the user's inputting habits, or may be changed randomly.

The following describes, by way of example, the specific process of step (3), step (4), and step (5) by using an AMR audio file having 5 s recorded as an example. In the instant messaging information interface, the user first touches a record button icon, to record a short voice recording, which is limited to 5 seconds. A client of an instant messaging software automatically extracts a voice of 5 seconds thereof to generate an AMR format voice file. In a mobile communications terminal, a universal voice file is in a compressed AMR file format, and each second includes 50 frames of audio data (where one frame corresponds to 20 ms). Therefore, the voice of 5 seconds has 250 frames of audio data. If a sampling rate is 8000 times per second, there are 40000 pieces of data. Such data is a magnitude of a sound volume, and is usually 8 bits or 16 bits. 10 expression icons are used to represent the voice of 5 seconds, that is, for every 0.5 second, there is one corresponding expression icon. That is, for every 25 frames of audio data, one expression icon is generated. During forming of the expression curve, every 25 frames are used as one time period in a chronological order, and the maximum PCM value corresponding to each frame of audio data is used as a sound volume of the current frame of audio data. Sound volumes corresponding to the 25 frames of audio data are compared, the maximum value thereof is used as a sound volume of the time period, and further sound volume levels are quantified. In a subsequent process of forming the expression curve, a sound volume level corresponding to each time period is used as an index for selecting an expression icon.

Figure 3:
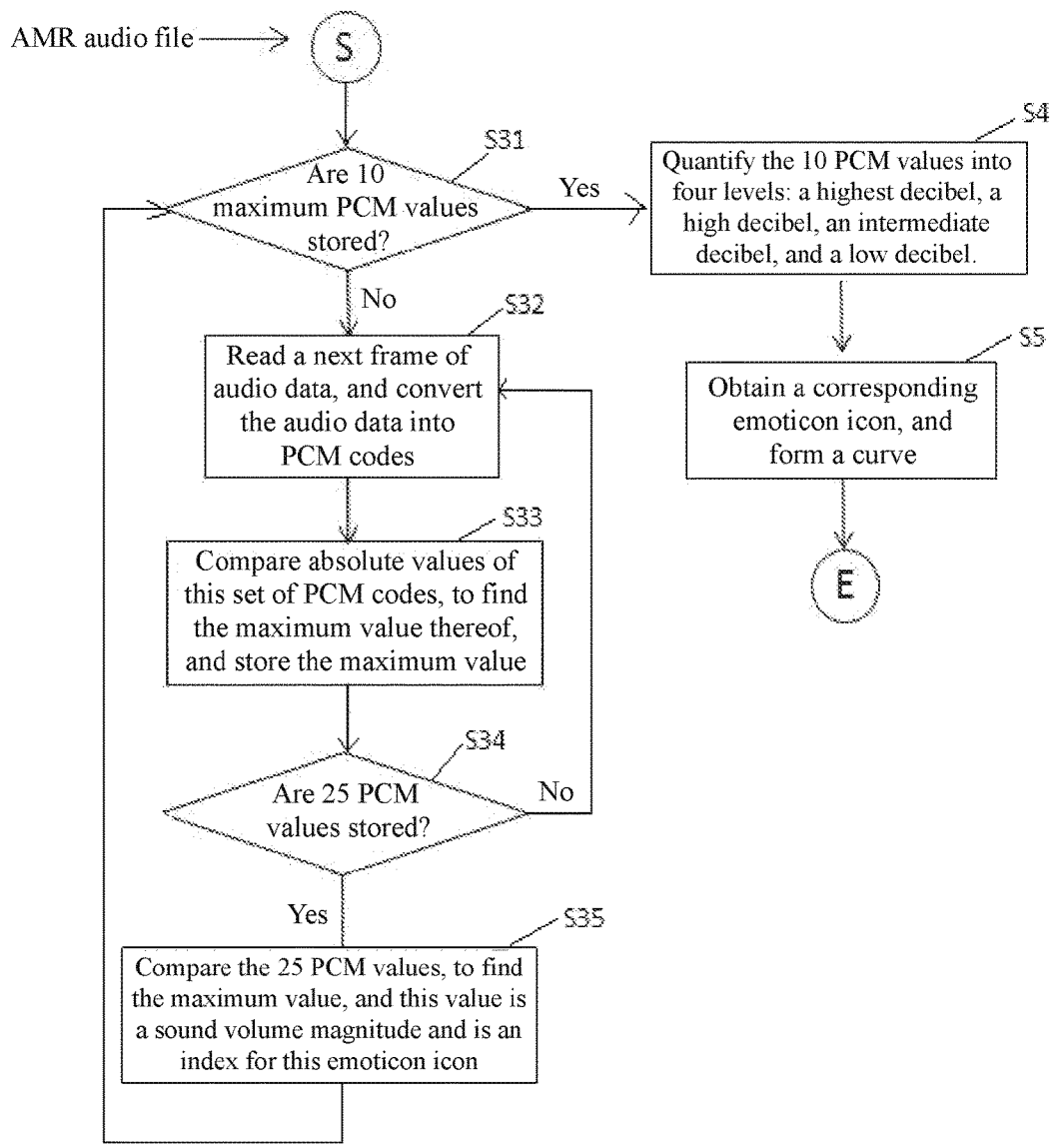
FIG. 3 is a flowchart for generating an expression curve from an audio file.

A specific implementation procedure of step (3), step (4), and step (5) is shown in FIG. 3, and specifically includes the following steps: Step (31): Determine whether the maximum PCM value corresponding to 10 time periods is stored, and if yes, enter step (4), or if not, perform step (32). Step (32): Read a next frame of audio data, and convert the current frame of audio data into PCM codes. Step (33): Compare absolute values of this set of PCM codes, to find the maximum value thereof, and store the maximum value. Step (34): Determine whether 25 PCM values corresponding to the current time period are stored, and if yes, enter step (35); or if not, return to step (32). Step (35): Compare the 25 PCM values, to fine the maximum value thereof, use this value as a sound volume in the time period, and then return to step (31). In step (4), this group of 10 PCM values is quantified into four levels: a highest decibel, a high decibel, an intermediate decibel, and a low decibel. In step (5), an expression curve that uses the time period as the horizontal axis and the sound volume level as the vertical axis is constructed according to a result of the quantification in step (4).

Figure 4:
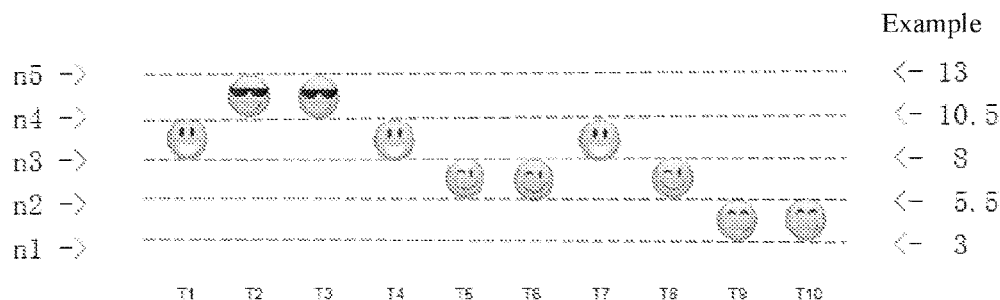
FIG. 4 is a schematic principle diagram of quantifying 10 PCM values into four corresponding levels.

In step (4), a process of quantifying the 10 PCM values into the four levels shown in FIG. 4 further includes the following steps: (41): Select the minimum PCM value as a lower limit (n1) of the low decibel, and select the maximum PCM value as an upper limit (n5) of the very high decibel. (42): Calculate a decibel difference between two adjacent levels: d=(the maximum PCM value−the minimum PCM value)/4, and calculate boundary values of decibels corresponding to the four levels: n2=the minimum PCM value+d; n3=the minimum PCM value+2d, and n4=the minimum PCM value+3d.

A decibel value corresponding to n2 is an upper limit of the low decibel, that is, a lower limit of the intermediate decibel. A decibel value corresponding to n3 is an upper limit of the intermediate decibel, that is, a lower limit of the high decibel. A decibel value corresponding to n4 is an upper limit of the high decibel, that is, a lower limit of the very high decibel. (43) Form five parallel lines from bottom to top in an order of n1, n2, n3, n4, and n5, and separately determine a decibel interval within which a PCM value corresponding to each time period correspondingly falls, to determine sound volume levels corresponding to the 10 PCM values. For example, in the embodiment shown in FIG. 4, PCM values corresponding to the lower limits of the low decibel, the intermediate decibel, the high decibel, and the very high decibel are respectively 3, 5.5, 8, and 10.5, and a PCM value corresponding to the upper limit of the very high decibel is 13. After the sound volume level is divided, corresponding sound volumes in time periods T2 and T3 fall within a very high decibel interval, corresponding sound volumes in time periods T1, T4, and T7 fall within a high decibel interval, corresponding sound volumes in time periods T5, T6, and T8 fall within an intermediate decibel interval, and corresponding sound volumes in time periods T9 and T10 fall within a low decibel interval.

In step (4), after the sound volumes corresponding to each time period are divided into sound volume levels, in step (5), an expression curve can be formed only by embedding expression icons corresponding to the sound volume levels of the different time periods into corresponding sound volume level intervals in a coordinate system using time as a horizontal axis and the sound volume level as a vertical axis. Specifically, in the expression curve shown in FIG. 4, in five equidistant parallel lines, 10 expression icons are used to express a fluctuation of emotions respectively according to time values. For example, a sound volume at T1 is a high decibel, and then an expression icon  with a high decibel is marked in a high decibel interval corresponding to T1. The rest may be deduced by analogy. The 10 expression icons shown in the figure are respectively embedded into sound volume level intervals respectively corresponding to T1 to T10.

After the expression curve shown in FIG. 4 is generated, in step (6), a monophonic tone corresponding to a sound volume level of each expression icon may further be obtained for tone pairing. The monophonic tone paired with each expression icon is embedded in a corresponding position in the expression curve. In this way, when the expression curve is displayed, the monophonic tones corresponding to the expression icons corresponding to T1 to T10 are sequentially resonated. The monophonic tone corresponding to the sound volume level of each expression icon is preset by a program. Mandarin has four tones: the first tone flat, the second tone rising, the third tone falling-rising, and the fourth tone falling. Each group of expression icons includes four expression icons corresponding to different sound volume levels, and the expression icons of the four sound volume levels are respectively paired with monophonic tones of the four tones. A monophonic tone corresponding to an expression icon is stored in association with the expression icon.

Figure 5:
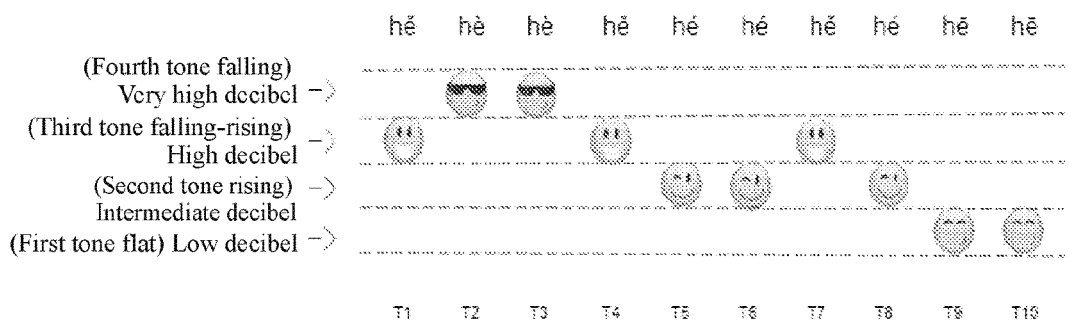
FIG. 5 is an example of a group of expression icons and monophonic tones corresponding to sound volume levels of the expression icons.
Figure 6:
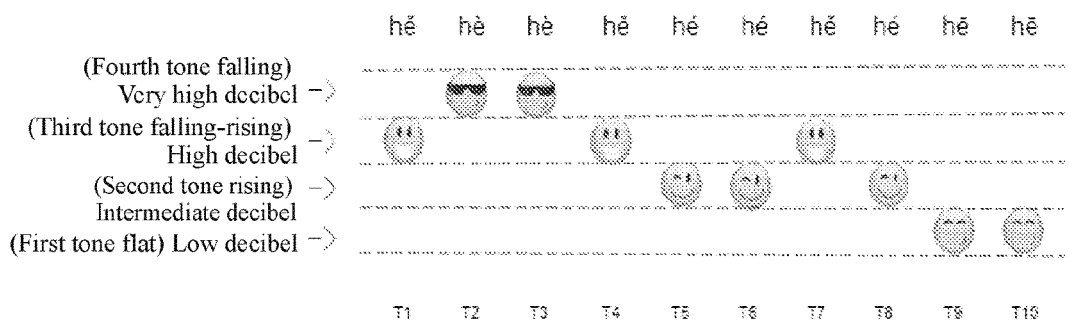
FIG. 6 is an example of an expression curve into which corresponding monophonic tones are embedded.

Specifically, as shown in FIG. 5, using the graph button "joy" as an example, an expression icon "joy"  with a very high decibel is allocated a tone (hè), an expression icon "joy"  with a high decibel is allocated a tone (hé), an expression icon "joy"  with an intermediate decibel is allocated a tone (hě), and an expression icon "joy"  with a low decibel is allocated a tone (hē). After corresponding monophonic tones are embedded into the expression curve shown in FIG. 4, an expression curve shown in FIG. 6 may be formed, where one monophonic tone is allocated above each expression icon. On an instant messaging system interface of the client of the user, only an expression curve formed by multiple expression icons may be displayed, but boundary lines of the sound volume levels and monophonic tones are not displayed, and a monophonic tone paired with the expression curve rings while the expression curve is being displayed. This sound may be set to 0.1 second, equal to five frames of audio data.

Figure 7:
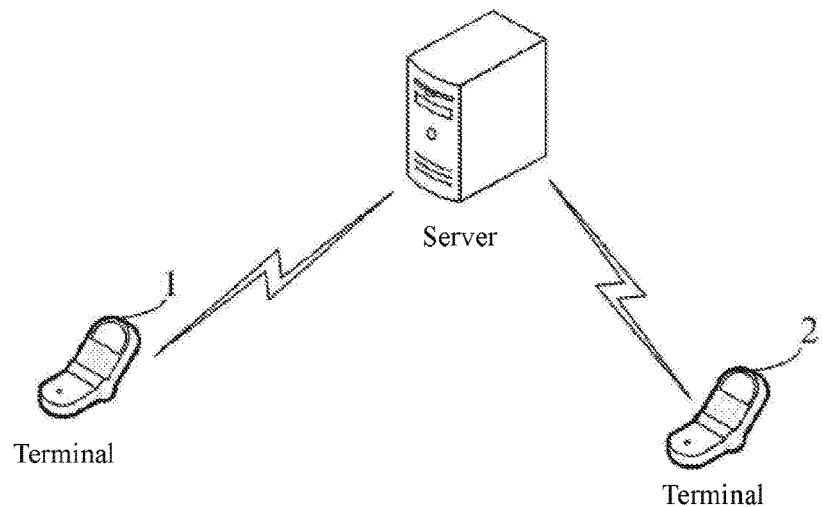
FIG. 7 is a schematic diagram of an instant messaging system shown according to an exemplary embodiment.

FIG. 7 is a schematic diagram of an instant messaging system shown according to an exemplary embodiment. As shown in FIG. 7, the instant messaging system includes a server and at least two terminals, for example, a terminal 1 and a terminal 2 in FIG. 7. The terminal 1 and the terminal 2 may be devices having a network connection function, such as a smart phone, a tablet computer, a multimedia player, an e-reader, or a wearable device. The server may be one server, or a server cluster including several servers, or a cloud computing service center. The at least two terminals and the server may be connected to each other by using a wired network or a wireless network. Assuming that a client of instant messaging software (such as QQ, WeChat, or Skype) is installed in each of the terminal 1 and the terminal 2, the terminal 1 may have an instant messaging conversation with the instant messaging software installed in the terminal 2 by using the server and according to the instant message software installed in the terminal In this case, in addition, after an expression curve is formed on the client interface of the terminal 1, multiple expression icons forming the expression curve and information about a corresponding position of each expression icon in the expression curve may be sent to another client (for example, the client of the terminal 2) by using the server, or multiple expression icons forming the expression curve and information about a corresponding position of each expression icon in the expression curve, together with a monophonic tone paired with each expression icon, may be sent to another client (for example, the client of the terminal 2) by using the server, to implement a process of interaction between different users.

Figure 8:
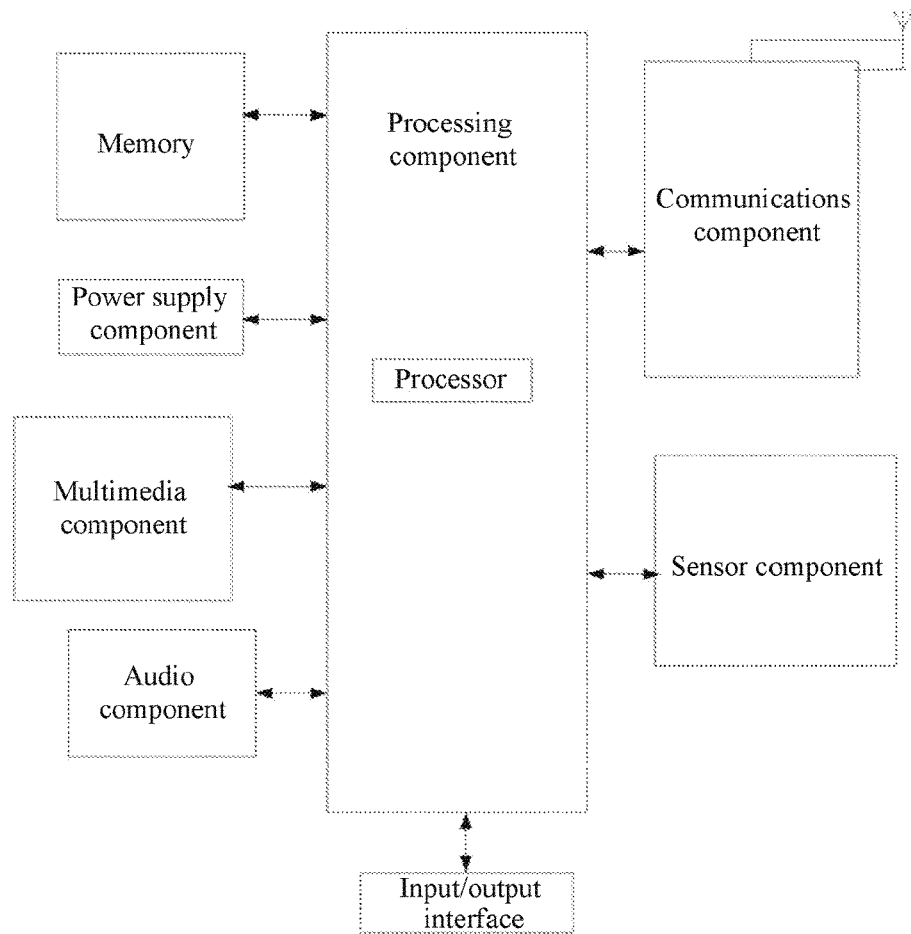
FIG. 8 is a block diagram of an instant messaging device shown according to an exemplary embodiment.

FIG. 8 is a block diagram of an instant messaging device (that is, the terminal in FIG. 7) shown according to an exemplary embodiment. The instant messaging device may be a mobile phone, a computer, a digital broadcasting terminal, a message transceiver, a game controller, a tablet device, a medical device, a fitness facility, a personal digital assistant, or the like. Referring to FIG. 8, the instant messaging device may include one or more of the following components: a processing component, a memory, a power supply component, a multimedia component, an audio component, an input/output (I/O) interface, a sensor component, and a communications component.

The processing component generally controls integral operations of the device, such as operations related to displaying, a phone call, data communication, a camera operation, and a record operation. The processing component may include one or more processors to execute instructions, so as to complete all or some steps of the foregoing method. In addition, the processing component may include one or more modules, to facilitate interaction between the processing component and other components. For example, the processing component may include a multimedia module, to facilitate interaction between the multimedia component and the processing component.

The memory is configured to store data of various types to support operations on the instant messaging device. Examples of the data include instructions of any application program or method that are used for operations on the instant messaging device, contact data, address book data, a message, a picture, a video, and the like. The memory may be implemented by a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc.

An electric power component provides electric power for various components of the instant messaging device. The electric power component may include a power supply management system, one or more power supplies, and other components related to generation, management, and allocation of power for the instant messaging device.

The multimedia component includes a screen that is between the instant messaging device and a user and that provides an output interface. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense a touch, a slide, and a gesture on the touch panel. The touch sensor may not only sense a perimeter of a touch or slide operation, but also detect duration and pressure related to the touch or slide operation. In some embodiments, the multimedia component includes a front-facing camera and/or a rear-facing camera. When the instant messaging device is in an operating mode, such as a shooting mode or a video mode, the front-facing camera and/or the rear-facing camera may receive external multimedia data. The front-facing camera and the rear-facing camera each may be a stationary optical lens system or have capabilities of a focus length and optical zoom.

The audio component is configured to output and/or input an audio signal. For example, the audio component includes a microphone (MIC). When the instant messaging device is in the operating mode, such as a call mode, a record mode, and a speech recognition mode, the microphone is configured to receive an external audio signal. The received audio signal may further be stored in the memory or be sent by using the communications component. In some embodiments, the audio component further includes a speaker, configured to output an audio signal.

The I/O interface provides an interface between the processing component and a peripheral interface module. The peripheral interface module may be a keyboard, a click wheel, a button, or the like. The button may include, but is not limited to: a home button, a volume button, a start-up button, and a lock button.

The sensor component includes one or more sensors, configured to provide a status assessment in each aspect for the instant messaging device. For example, the sensor component may detect a power-on/off state of the instant messaging device and relative positioning of components. For example, the components are a display and a keypad of the instant messaging device. The sensor component may further detect changes in a location of the instant messaging device or a location of a component of the instant messaging device, whether there is a touch between the user and the instant messaging device, and an azimuth or acceleration/deceleration of the instant messaging device and changes in a temperature of the instant messaging device. The sensor component may include a proximity sensor, configured to detect an adjacent object without any physical contact. The sensor component may further include an optical sensor, such as a CMOS or CCD image sensor, used in imaging application. In some embodiments, the sensor component may further include an acceleration sensor, a gyro sensor, a magnetic sensor, a pressure sensor, or a temperature sensor.

The communications component is configured to facilitate communication between the instant messaging device and other devices in a wired or wireless manner. The instant messaging device may access a communications standard-based wireless network, such as Wi-Fi, 2G, or 3G, or a combination thereof. In an exemplary embodiment, the communications component receives, by using a broadcast channel, a broadcast signal or broadcast-related information from an external broadcast management system. In an exemplary embodiment, the communications component further includes a near field communication (NFC) module to facilitate short-distance communication. For example, the NFC module may be implemented based on the radio frequency identification (RFID) technology, the Infrared Data Association (IrDA) technology, the ultra-wideband (UWB) technology, the Bluetooth (BT) technology, and other technologies.

In an exemplary embodiment, the instant messaging device may be implemented by using one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, to perform the expression curve generating method described above.

In an exemplary embodiment, a non-transitory computer readable storage medium including an instruction, for example, a memory including an instruction, is further provided. The instruction may be executed by a processor of the instant messaging device to implement the method described above. For example, the non-transitory computer readable storage medium may be a ROM, a random access memory (RAM), a CD-ROM, a magnetic tape, a floppy disk, or an optical data storage device.

A non-transitory computer readable storage medium is provided, and when an instruction in the storage medium is executed by a processor of an instant messaging device, the instant messaging device can perform the expression curve generating method described above.

By means of the instant messaging device provided in the embodiments of the present invention, in a process of chatting by using a client, a user first inputs a voice into the client to generate an audio file; selects an expression graph button corresponding to one type of expression from multiple expression graph buttons, where a single expression graph button corresponds to one or more groups of expression icons, and each group of expression icons includes multiple expression icons respectively corresponding to different sound volume levels; divides the audio file into multiple equal time periods according to duration, and calculates a corresponding sound volume of each time period; quantifies the corresponding sound volumes of the different time periods in the audio file into different sound volume levels; obtains an expression icon corresponding to a sound volume level of each time period from a same group of expression icons corresponding to the selected expression graph button, and generates an expression curve using time as a horizontal axis and the sound volume level as a vertical axis, where the expression icon corresponding to the sound volume level is displayed in the position of the sound volume level corresponding to each time period; and displays the formed expression curve. Therefore, instant messaging representation forms are enriched.

Figure 9:
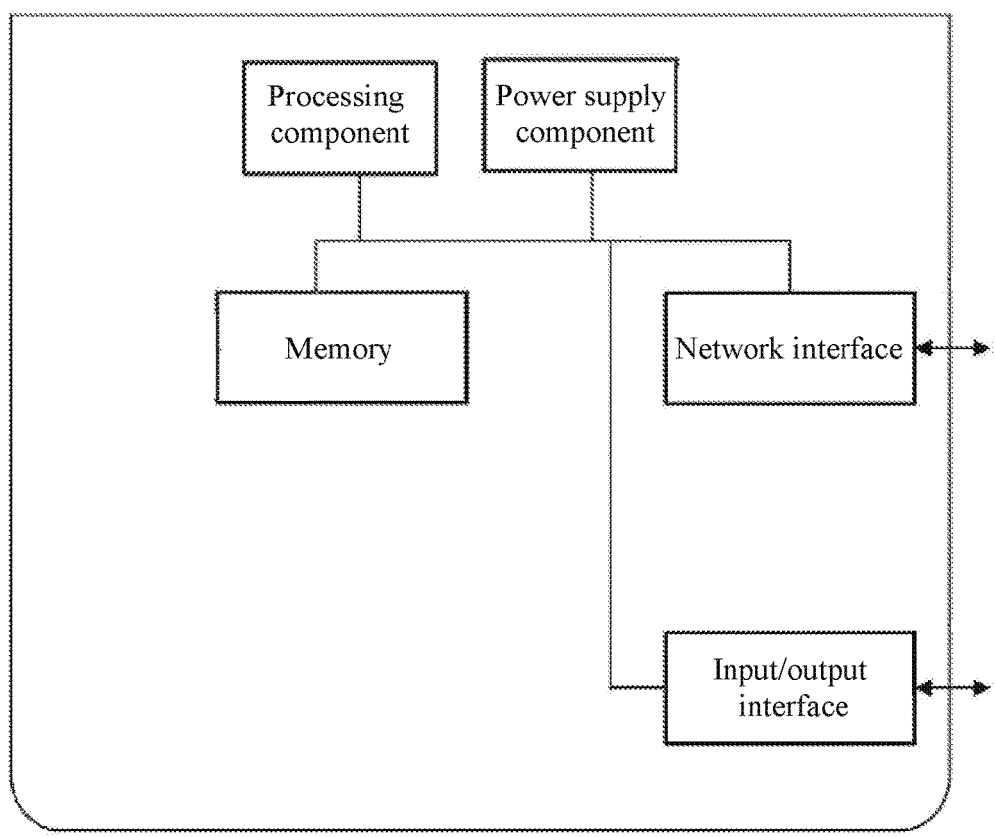
FIG. 9 is a block diagram of a server used for instant messaging shown according to an exemplary embodiment.

FIG. 9 is a block diagram of a server used for instant messaging shown according to an exemplary embodiment.

Referring to FIG. 9, the server includes a processing component, and further includes one or more processors, and a memory resource represented by a memory, configured to store an instruction that can be executed by the processing component, for example, an application program. The application program stored in the memory may include one or more modules, each of which corresponds to a set of instructions. In addition, the processing component is configured to execute instructions, to perform the expression curve generating method described above.

The server may further include one power supply module, configured to perform power supply management of the server, one wired or wireless network interface, configured to connect the server to a network, and one input/output (I/O) interface. The server may operate an operating system stored in the memory, for example, Windows Server™, Mac OSX™, Unix™, Linux™, or Free BSD™.

To sum up, by means of the expression curve generating method and the device thereof that are provided in the embodiments of the present invention, an expression curve may be automatically formed after voice input is performed. Particularly, a fluctuating expression curve formed by multiple expressions representing a same type of emotion may be formed at one time. Therefore, the user's usage experience is good. In addition, a corresponding tone is allocated to the formed expression curve, so that when the expression curve is being displayed, a monophonic tone paired with the expression curve rings, and therefore, the user's emotions can be expressed more vividly. Compared with an expression inputting manner that is widely used in the existing instant messaging system and in which a user selects multiple expression icons for inputting at multiple times, the foregoing expression curve generating method has higher input efficiency, and can more accurately represent the user's emotions in a more humanized manner.

The expression curve generating method based on voice input and the device thereof that are provided in the present invention are described above in detail. Any apparent modifications made by a person of ordinary skill in the art without departing from the essence and spirit of the present invention all constitutes an infringement to the patent rights of the present invention, and shall bear corresponding legal liabilities.

What is claimed is:

1. An expression curve generating method based on voice input, wherein the method comprises the following steps:
   (1) performing voice input to generate an audio file;
   (2) selecting an expression graph button corresponding to one type of expression from multiple expression graph buttons, wherein a single expression graph button corresponds to one or more groups of expression icons, and each group of expression icons comprises multiple expression icons respectively corresponding to different sound volume levels;
   (3) dividing the audio file into multiple equal time periods according to duration, and calculating a corresponding sound volume of each time period;
   (4) quantifying the corresponding sound volumes of the different time periods in the audio file into different sound volume levels;
   (5) obtaining an expression icon corresponding to a sound volume level of each time period from a same group of expression icons corresponding to the expression graph button selected in step (2), and generating an expression curve using time as a horizontal axis and the sound volume level as a vertical axis, wherein the expression icon corresponding to the sound volume level is displayed in the position of the sound volume level corresponding to each time period; and
   (6) displaying the expression curve formed in step (5).

2. The expression curve generating method according to claim 1, wherein the method further comprises step (7): touching the expression graph button selected in step (2) again, changing a group of expression icons, and then returning to step (5) to reconstruct an expression curve by using the group of expression icons.

3. The expression curve generating method according to claim 2, wherein:
   in step (7), when the expression graph button is touched at a single time, the multiple groups of expression icons corresponding to the expression graph button are sequentially changed.

4. The expression curve generating method according to claim 2, wherein:
   in step (7), when the expression graph button is touched at a single time, the multiple groups of expression icons corresponding to the expression graph button are changed according to an input habit of a user.

5. The expression curve generating method according to claim 1, wherein in step (3), a process of dividing the audio file into N equal time periods, wherein each time period comprises m frames of audio data, and calculating sound volumes corresponding to the N time periods comprises the following steps:
   (31) determining whether the sound volume corresponding to the N time periods is stored, and if yes, entering step (4), or if not, performing step (32);
   (32) reading a next frame of audio data, and converting the read frame of audio data into PCM codes;
   (33) comparing absolute values of this set of PCM codes, to find the maximum value thereof, and storing the maximum value;
   (34) determining whether all m PCM values corresponding to the m frames of audio data in the current time period have been obtained and stored, if yes, entering step (35); or if not, returning to step (32); and
   (35) comparing the m PCM values, to find the maximum value thereof, using this value as a sound volume in the time period, and then returning to step (31).

6. The expression curve generating method according to claim 1, wherein in step (4), quantifying N PCM values into four sound volume levels: a very high decibel, a high decibel, an intermediate decibel, and a low decibel comprises the following steps:
   (41) selecting a minimum PCM value from the N PCM values as a lower limit (n1) of the low decibel, and selecting a maximum PCM value from the N PCM values as an upper limit (n5) of the very high decibel;
   (42) calculating a decibel difference between two adjacent levels: d=(the maximum PCM valuethe minimum PCM value)/4, and calculating boundary values of decibels corresponding to the four levels: n2=the minimum PCM value+d; n3=the minimum PCM value+2d, and n4=the minimum PCM value+3d; and
   (43) forming five parallel lines from bottom to top in an order of n1, n2, n3, n4, and n5, and separately determining a decibel interval within which a PCM value corresponding to each time period correspondingly falls, to determine sound volume levels corresponding to the N PCM values.

7. The expression curve generating method according to claim 1, wherein: step (6) may further comprises step (60): obtaining a monophonic tone corresponding to a sound volume level of each expression for the expression, and sequentially resonating monophonic tones corresponding to multiple expression icons one by one when the expression curve is being displayed.

8. The expression curve generating method according to claim 7, wherein:
   in step (60), each group of expression icons comprises expression icons corresponding to four sound volume levels, and the expression icons are respectively paired with four tones in the Chinese pinyin.

9. The expression curve generating method according to claim 1, wherein: in step (1), a user records, by touching a record button icon, a short voice recording to generate an audio file, and a storage type of the audio file is an AMR format file.

10. The expression curve generating method according to claim 1, wherein: in step (2), the multiple expression graph buttons provided for a user to select are expression graph buttons corresponding to seven emotions "pleasure", "anger", "sorrow", "love", "fear", "disgust", and "hatred".

11. An instant messaging device, comprising:
   a processor; and
   a memory, configured to store an executable instruction of the processor, wherein
   the processor is configured to perform the expression curve generating method according to claim 1.

12. An instant messaging system, comprising a server and at least two terminals, wherein the terminal is connected to the server by using a wired network or a wireless network, wherein:
   the terminal is the instant messaging device according to claim 11.

* * * * *